United States Patent [19]
Nakamura et al.

[11] Patent Number: 5,927,360
[45] Date of Patent: Jul. 27, 1999

[54] ROTARY VENEER LATHE

[75] Inventors: Tsuyoshi Nakamura; Kazuya Kawai, both of Obu, Japan

[73] Assignee: Meinan Machinery Works, Inc., Obu, Japan

[21] Appl. No.: 08/982,668

[22] Filed: Dec. 2, 1997

[30] Foreign Application Priority Data

Dec. 20, 1996 [JP] Japan .................................. 8-355054

[51] Int. Cl.$^6$ .............................. B27L 5/02; B27B 1/00
[52] U.S. Cl. ...................... 144/382; 144/213; 144/357; 144/365; 144/346.1; 364/474.02; 364/474.09
[58] Field of Search ................ 364/474.09, 474.02; 144/209.1, 213, 213 A, 356, 357, 365, 382, 394, 404, 242.1, 246.1

[56] References Cited

U.S. PATENT DOCUMENTS

| | | |
|---|---|---|
| 4,557,304 | 12/1985 | Shurm . |
| 4,893,663 | 1/1990 | Ely .............................................. 144/357 |
| 5,141,038 | 8/1992 | Nakaya . |
| 5,564,253 | 10/1996 | Nakaya ..................................... 144/356 |
| 5,787,949 | 8/1998 | Koike et al. .............................. 144/357 |

*Primary Examiner*—W. Donald Bray
*Attorney, Agent, or Firm*—Morgan & Finnegan, L.L.P.

[57] ABSTRACT

A centerless rotary veneer lathe comprises a slidable backup device which is disposed on the opposite side of a peeler log from a knife carriage of the lathe. The backup device has a pair rotatable rolls located one above the other with the axes thereof extending in parallel to the axis of the log. The paired rolls are disposed such that the axes of such two rolls are spaced at substantially the same distance from an imaginary line extending perpendicularly to the axis of the log and in parallel to the direction in which the backup device is moved. In operation of the veneer lathe with the rolls set in contact with the log periphery, the knife carriage and the backup device are moved synchronously at such a variable controlled rate that causes peeling of veneer with a predetermined thickness.

29 Claims, 10 Drawing Sheets

ROTARY VENEER LATHE

FIELD OF THE INVENTION

The present invention relates to a rotary veneer lathe for peeling wood veneer from a peeler block or a log. More specifically, the invention relates to a centerless veneer lathe which is operable to peel veneer without spindles for supporting and driving the log at its opposite axial ends.

BACKGROUND OF THE INVENTION

For yield improvement in veneer peeling by a rotary veneer lathe, it is important that a log should be peeled down to as small a diameter as possible. However, the presence of a pair of spindles engaged with the log at its opposite ends for supporting and driving the log prevents it from being peeled smaller than the diameter of such spindles. To overcome such a problem, a centerless rotary veneer lathe has been proposed in the art which is operable with the spindles retracted away from the log ends from the beginning or in the middle of veneer peeling operation and supports the log by any appropriate means other than the spindles.

One such centerless veneer lathe is disclosed, for example, by U.S. Pat. No. 5,141,038 assigned to the same assignee. This veneer lathe includes a knife carriage carrying a veneer peeling knife and a peripheral drive system for rotating the log from its periphery, and a rotatable backup roll disposed on the opposite side of the log from the knife carriage and contactable with the log peripheral surface during veneer peeling operation for supporting or backing up the log on the above opposite side of the log and also for measuring the current log peripheral speed. The lathe further includes a plurality of backup rolls provided below the log and movable into contact engagement with the log periphery so as to support the log from its bottom.

During initial peeling operation of this centerless veneer lathe, the spindles are engaged with the log at its axial ends and the knife carriage is moved toward the log axial center at a variable feedrate controlled in accordance with the spindle speed so that the knife on its carriage cuts into the rotating log for a predetermined depth for each turn of the log. At any convenient time during the peeling operation, e.g. at a time just after the log has been rounded to become substantially cylindrical, the backup rolls are brought into contact with the log periphery and the spindles are then retracted from the log axial ends. After such contact engagement of the rolls, they are advanced toward the log axial center at the same rate as the feedrate of the knife carriage so that the rolls maintain engagement with the log periphery for measuring the log peripheral speed while backing up the log. After the spindles have thus retracted, the knife carriage feed is effected according to the current log angular speed which can be figured out by a control apparatus from the current log peripheral speed and the current log diameter which can be determined from the current knife carriage position.

This prior centerless veneer lathe is disadvantageous in that it has a plurality of backup rolls all of which need be controlled so as to move synchronously with the knife carriage and, therefore, the lathe becomes complicated in structure and hence costly and also troublesome in the maintenance of the lathe.

SUMMARY OF THE INVENTION

Accordingly, an object of the invention is to provide an improved centerless veneer lathe over the above-described veneer lathe.

In order to achieve the above object, there is provided a rotary veneer lathe which comprises a pair of rotatable spindles for supporting and driving a peeler log at its opposite ends, a slidable knife carriage carrying a veneer peeling knife having a cutting edge at its tip end, and means for moving the knife carriage toward the axial center of the log, and a peripheral drive engageable with the log peripheral surface adjacent the cutting edge of the knife for rotating the log. The spindles are retractable from the log ends in the middle of veneer peeling operation of the lathe. The lathe further includes a slidable backup device which is disposed on the opposite side of the log from the knife carriage and has a pair rotatable rolls carried by the backup device for movement therewith. The paired rolls are located one above the other with the axes thereof extending in parallel to the axis of the log. There is also provided drive means for moving the backup device linearly so as to bring the paired rolls into engagement with the log peripheral surface and thereafter to move the rolls in engagement with the log periphery toward the knife carriage. The rolls on the backup device are disposed such that the axes of such two rolls are spaced at substantially the same distance from an imaginary line extending perpendicularly to the axis of the log and in parallel to the direction in which the backup device is moved. The lathe further includes a control apparatus which is operable to control the operation of the respective means for moving the knife carriage and the backup device such that the knife carriage and the backup device are moved synchronously at such a variable rate that causes peeling of veneer with a desired thickness.

In a preferred embodiment of the invention, there are provided means for detecting the current radius of the log and means for detecting the current rotational speed of the log, and the control apparatus is operable to effect the synchronous movement of the knife carriage and the backup device at the variable rate according to the current radius and rotational speed of the log determined by the respective detecting means. The log radius detecting means is operatively connected with the knife carriage moving means to determine the current position of the moving knife carriage. One of the paired rolls is driven by the rotating log in contact therewith and the log rotational speed detecting means is operatively connected with this one roll so as to measure the peripheral speed of the log. While the other of the paired rolls is positively driven to aid in rotating the log.

In one embodiment of the invention, the peripheral drive includes a rotatable roll bar extending in parallel to the axis of the log and having a number of projections on the peripheral surface thereof for driving engagement with the log peripheral surface. In another embodiment, the peripheral drive is provided by a plurality of drive wheels arranged at spaced intervals in parallel to the axis of the log for driving engagement with the log peripheral surface. In this embodiment, there is provided a plurality of pressure bars each located between any two adjacent drive wheels for pressing the log peripheral surface adjacent the cutting edge of the knife.

When handling a log having irregular peripheral surface, the control apparatus operates to active the backup device moving means to bring the paired rolls into engagement with the log peripheral surface after the log has been rounded into a substantially cylindrical shape. When peeling a log stock which has been already cut into a cylindrical shape, on the other hand, the veneer lathe may dispense with the spindles. In such a case, the slidable backup device is arranged so that it moves linearly along a such an oblique line that the backup device is moved upward gradually while moving toward the knife carriage.

The features and advantages of the present invention will become apparent to those skilled in the art from the following description of embodiments according to the invention, which description is made with reference to the accompanying drawings, wherein:

DETAILED DESCRIPTION OF PREFERRED EMBODIMENT

Figure 1:
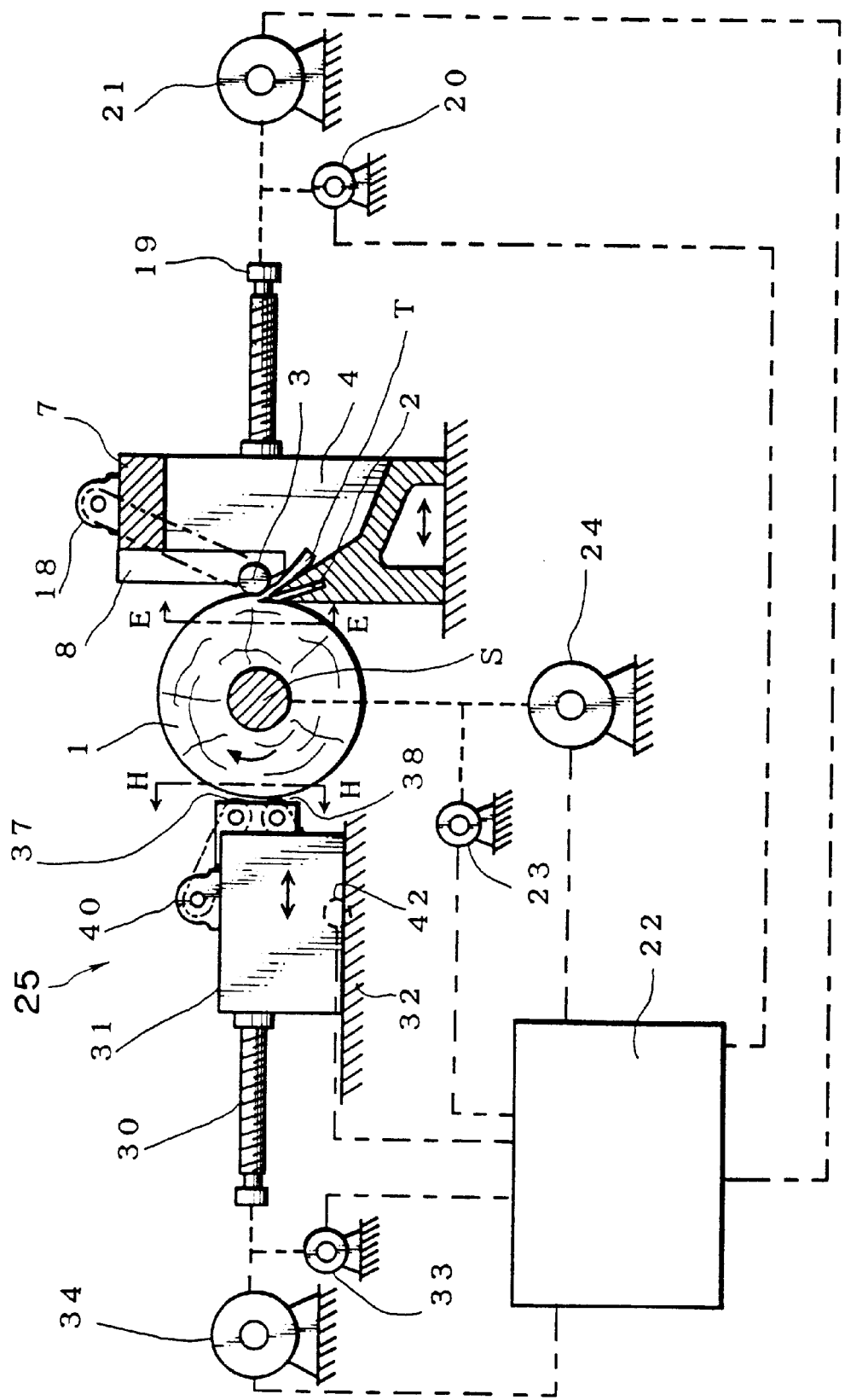
FIG. 1 is a schematic side view of a preferred embodiment of rotary veneer lathe according to the invention.

Firstly referring to FIG. 1 showing the preferred embodiment of veneer lathe constructed according to the invention, the lathe comprises a pair of spindles S (only one spindle shown in the drawing) rotatable in arrow direction and engageable with the log 1 at its axial ends for supporting and driving the log, and a knife carriage 4 reciprocally slidable toward and away from the axial center of the log 1 and having a veneer peeling knife 2 extending in perpendicular relation to the direction in which the knife carriage 4 is moved. The veneer knife 2 is engageable with the log periphery for peeling veneer T from the log 1. The knife carriage 4 also has a roll bar 3 extending in parallel to the knife 2 for driving the log 1 from its periphery while pressing the log adjacent the cutting edge of the knife 2. The lather further comprises a backup device 25 which is disposed on the opposite side of the log 1 from the knife carriage 4, and a control apparatus 22 for controlling the operation of the veneer lathe. The backup device 25 is reciprocally slidable horizontally toward and away from the knife carriage 4 and carries a pair of rolls 37, 38 located one above the other.

Figure 2:
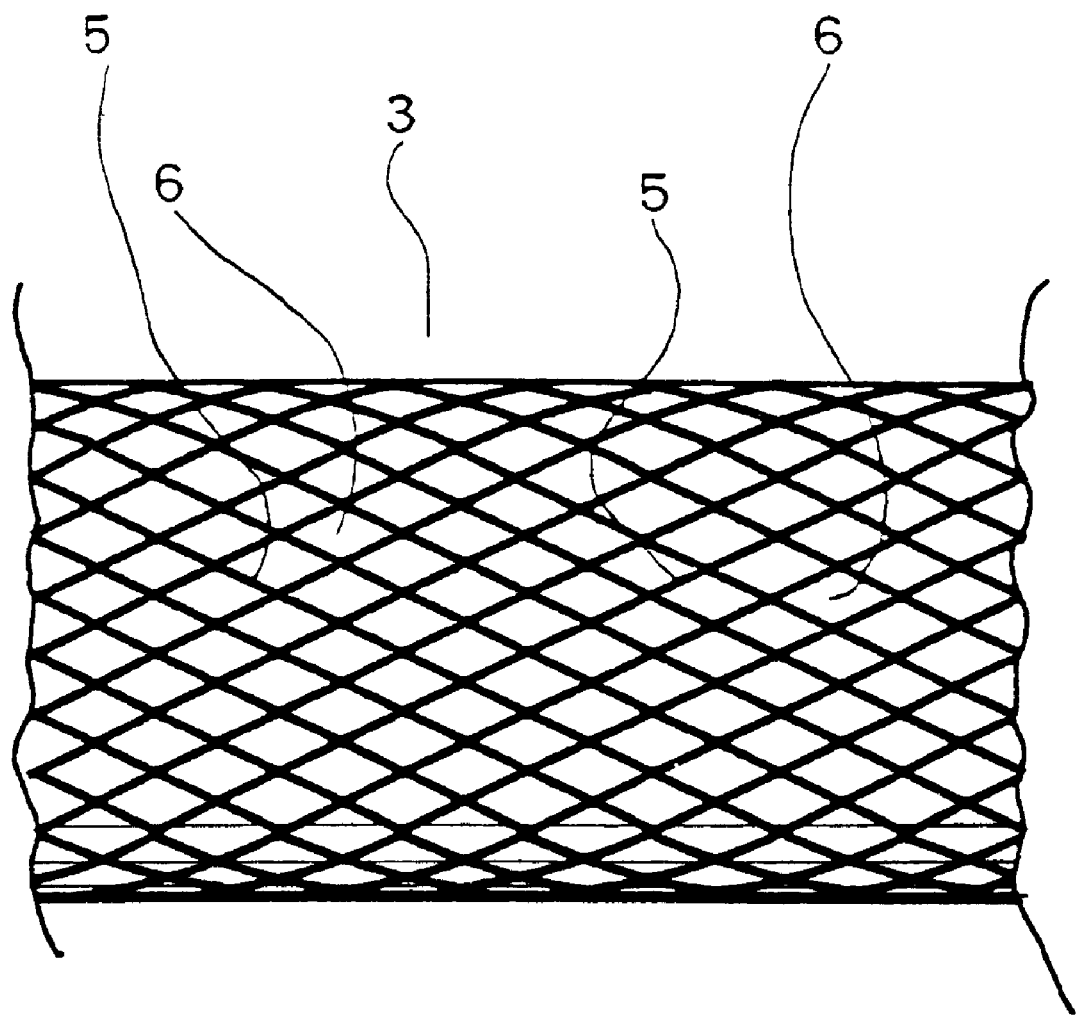
FIG. 2 is an enlarged fragmentary front view of a roll bar which is used in the veneer lathe of FIG. 1.

Referring to FIG. 2 showing part of the roll bar 3, its peripheral surface is provided with a number of projections 6 of a lozenge shape, which may be formed by cutting on the peripheral surface of a cylindrical rod stock with a diameter of about 16 mm two series of spiral grooves 5 each having a depth of about 0.5 mm and a width of about 0.5 mm, with one series of the grooves 5 cut spirally at a spacing of about 3 mm and at an angle of about 15 degrees with respect to an imaginary line extending on the cylinder rod peripheral surface in parallel to the axis of the rod, and the other series of the grooves 5 cut similarly, but extending spirally so as to intersect the first series of the grooves 5 so that a number of lozenge-shaped projections 6 are formed on the peripheral surface of the cylindrical bar. These projections 6 are provided for the purpose of improving the driving engagement of the roll bar 3 with the log peripheral surface.

Figure 3:
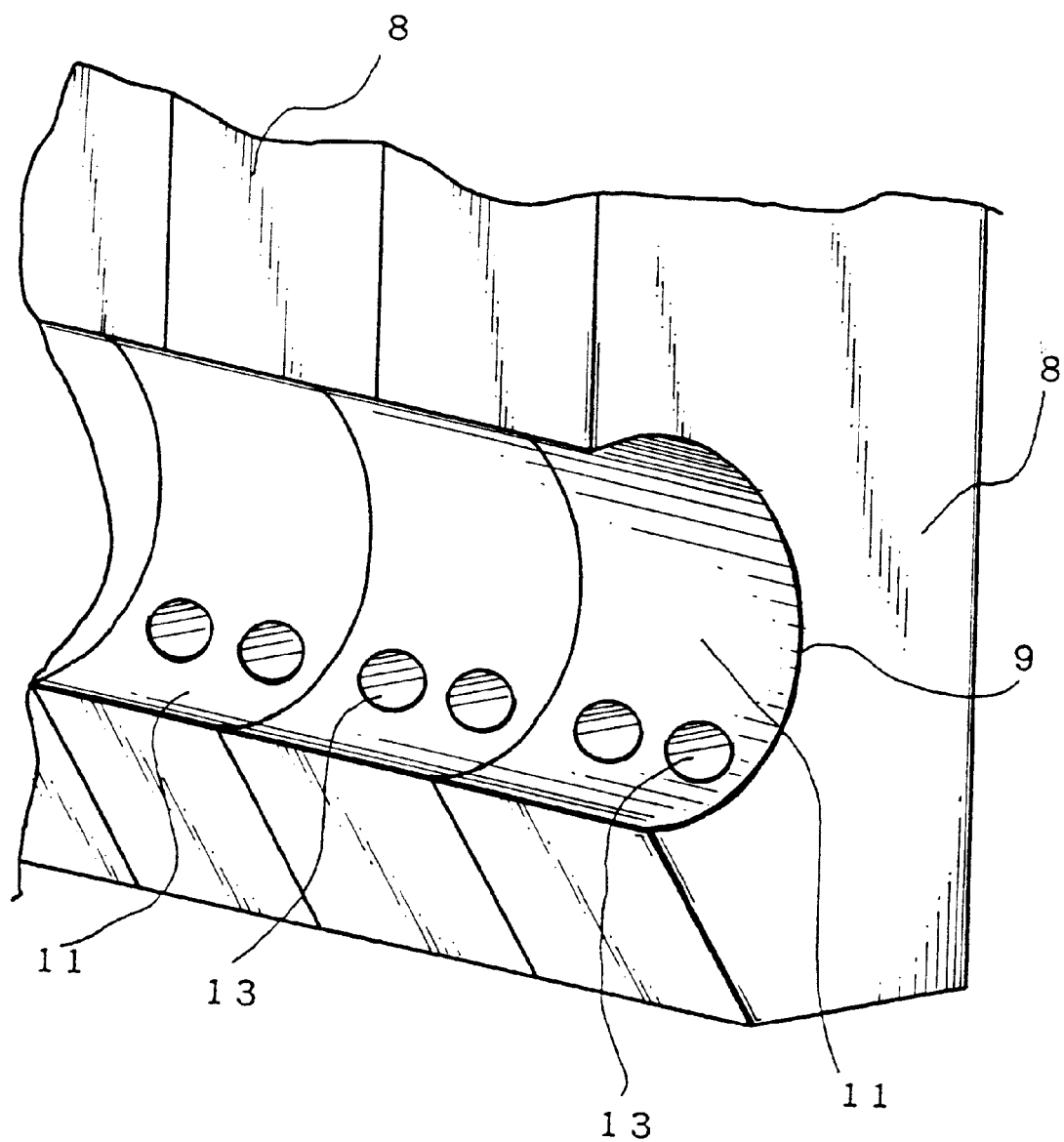
FIG. 3 is a fragmentary perspective view showing some of holders for holding the roll bar of FIG. 2.
Figure 4:
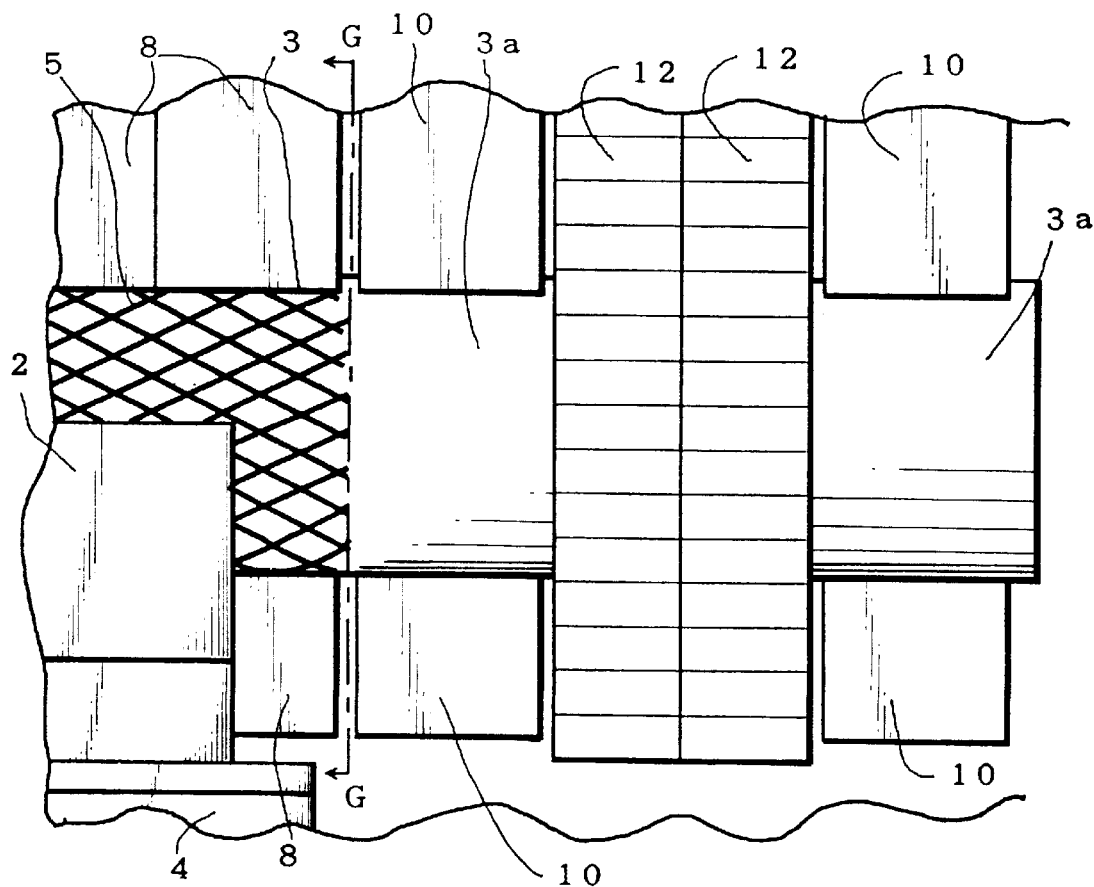
FIG. 4 is an illustrative view as seen in arrow direction from a dash-and-dot line E—E of FIG. 1 with a log removed for clarity of the illustration.

Now referring to FIGS. 1 and 3, there is shown some of a plurality of roll bar holders 8 which are fixed to a block 7 forming part of the knife carriage 4 and disposed one beside another in parallel relation to the knife 2. Each roll bar holder 8 has a width of about 35 mm and is formed at the lower end portion thereof a circular recess 9 having an inner circumferential surface 11 whose radius of curvature is substantially the same as that of the roll bar 3, i.e. about 8 mm. The surface 11 extends for a circular arc that is greater than the semicircular arc of the roll bar 3. Thus, the recess 9 of the roll bar holder 8 forms together with similar recesses of the other holders an elongated accommodation recess in which the roll bar 3 is inserted and rotatably held as shown in FIG. 4. The roll bar 3 has opposite ends 3a (one end shown in FIG. 4) which are rotatably supported by a pair of spaced roll bar end holders 10 which are also fixed to the block 7. Each roll bar end 3a carries a sprocket wheel (not shown) round which are mounted drive chains 12 driven by a motor 18 (FIG. 1) for driving the roll bar 3 by way of such chains 12. The motor 18 has a torque limiter (not shown) and is adapted to drive the roll bar 3, when it is not drivingly engaged with the log, at a peripheral speed of about 60 meters per minute.

Figure 5:
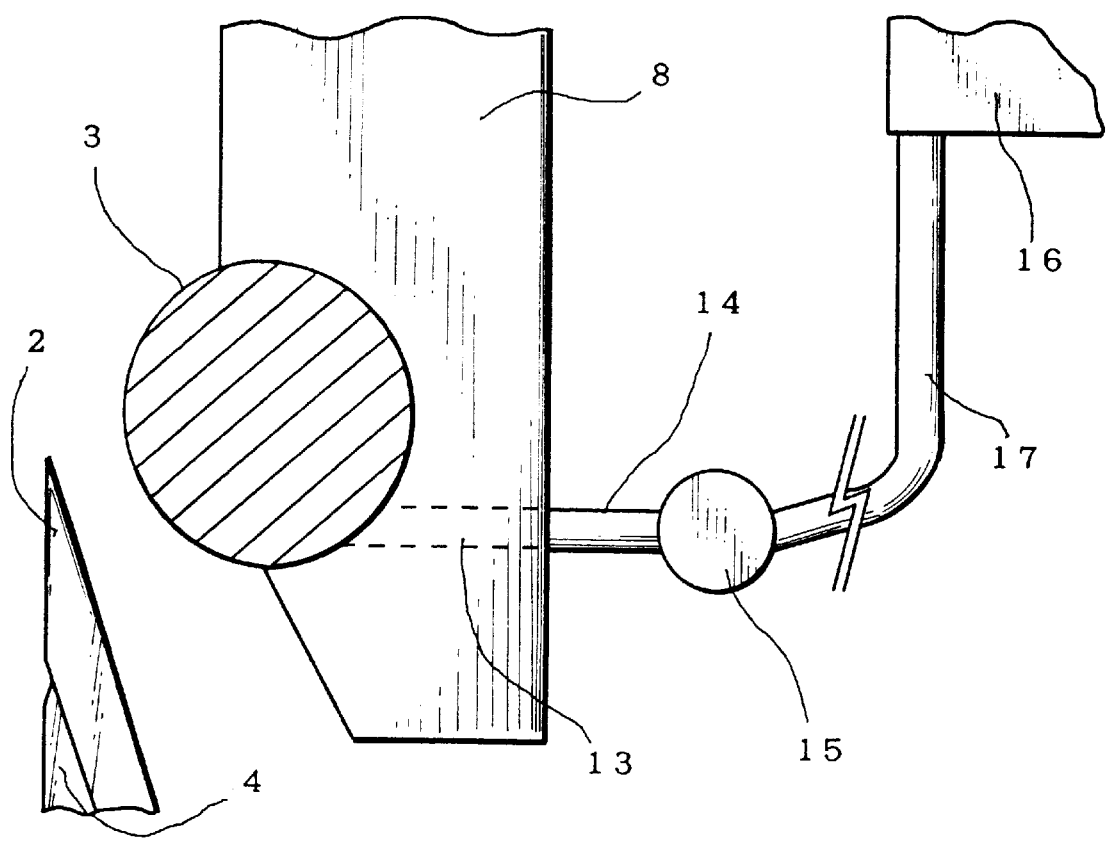
FIG. 5 is a fragmentary schematic cross section as seen in arrow direction from a dash-and-dot line G—G of FIG. 4.

As shown in FIGS. 3 and 5, each roll bar holder 8 has formed therein two water feeding passages 13 extending from the backside of the holder to the inner circumferential surface 11. Each passage 13 is connected via a tube 14 to a distributor tube 15 having closed ends and disposed in parallel to the knife 1 to extend for a distance substantially the same as the total width of the roll bar holders 8. The distributor tube 15 is in turn connected to a water reservoir 16 through a tube 17 so that the water in the reservoir is fed by gravity through the tubes 17, 15, 14 and the passage 13 to the roll bar 3 rotating in the recesses 9 so that the water fills the spiral grooves 5 on the roll bar 3 to lubricate and cool the roll bar 3.

Referring back to FIG. 1, the knife carriage 4 includes a pair of feed screws 19 which are threadingly inserted through a pair of internally threaded holes (not shown) in the knife carriage 4 and a variable-speed drive 21 such as servo motor for driving the feed screws 19 synchronously thereby to cause the knife carriage 4 to slide reciprocally with respect to the log 1 in a manner well known in the art. Associated with the lead screws 19 is a detector 20 such as rotary encoder which is operable to count the number of turns of either one of the feed screw 19 for determining the current log radius which corresponds to the distance between the axial center of the log 1 and the tip end of the knife 2. As indicated in FIG. 1, the motor 21 is connected to the control apparatus 22 to receive therefrom a command signal to move the knife carriage 4 at a controlled variable feedrate for peeling veneer T with a desired thickness. The detector 20 is also connected to the control apparatus 22 to provide thereto signals representing the current log radius.

The spindles S are movable toward and away from the opposite axial ends of the log 1 by any suitable drive such as hydraulic cylinders (now shown) for engagement with and disengagement from the log ends. The spindles S are driven to rotate in arrow direction (counter-clockwise as seen on the drawing) by a variable-speed drive 24 such as DC motor which is connected to the control apparatus 22. Thus, part of the driving force to rotate the log 1 is provided also by the spindles S. The spindle drive includes a detector 23 such as rotary encoder for monitoring the spindle speed by counting the number of revolutions of the spindles S per a given length of time (e.g. rpm). The speed detector 23 is also connected to the control apparatus 22 for providing thereto a signal representative of the current spindle speed.

Thus, the control apparatus 22 performs a function of controlling the operation of the motor 21 according to the current log rotational speed determined by the detector 23 so that the knife carriage 4 is fed at the controlled variable feedrate for cutting veneer T with the desired thickness, as mentioned above, and also the operation of the spindle motor 24 according to the current log radius determined by the detector 23 so that the spindles S are rotated at such a progressively increasing speed as to rotate the log 1 at a substantially constant peripheral speed while the log diameter is being reduced by veneer cutting. In the illustrated embodiment, the motor 24 is operated to drive the spindles S so as to maintain a substantially constant peripheral speed of the log 1 that is slightly smaller than that of the aforementioned roll bar 3, say about 58 meters per minute.

Figure 6:
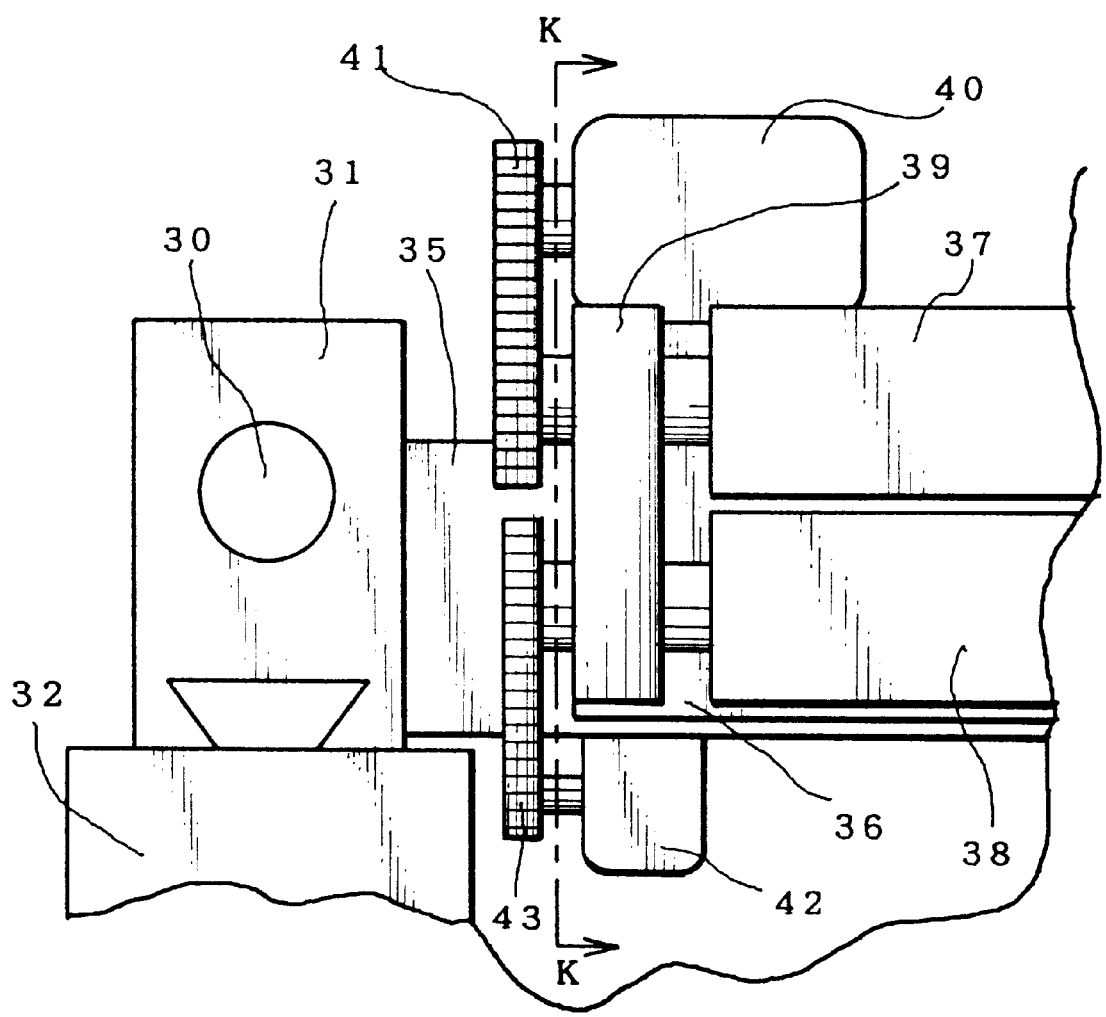
FIG. 6 is an illustrative view as seen in arrow direction from a dash-and-dot line H—H of FIG. 1 with a log removed for clarity.

As shown in FIGS. 1 and 6, the backup device 25 includes a pair of slidable blocks 31 located on opposite sides of the lathe and movably mounted on a stationary base 32 of the lathe by way of a dovetail groove formed in the bottom of the slidable block 31 and a complementary guide on the base 32. Thus, the blocks 31, hence the backup device 25, move linearly as indicated by double-headed arrow in FIG. 1. As shown in FIG. 6, the blocks 31 have an internally threaded hole through which a feed screw 30 is threadingly engaged, respectively. The feed screws 30 are driven to rotate by a variable-speed drive 34 such as servo motor.

Figure 7:
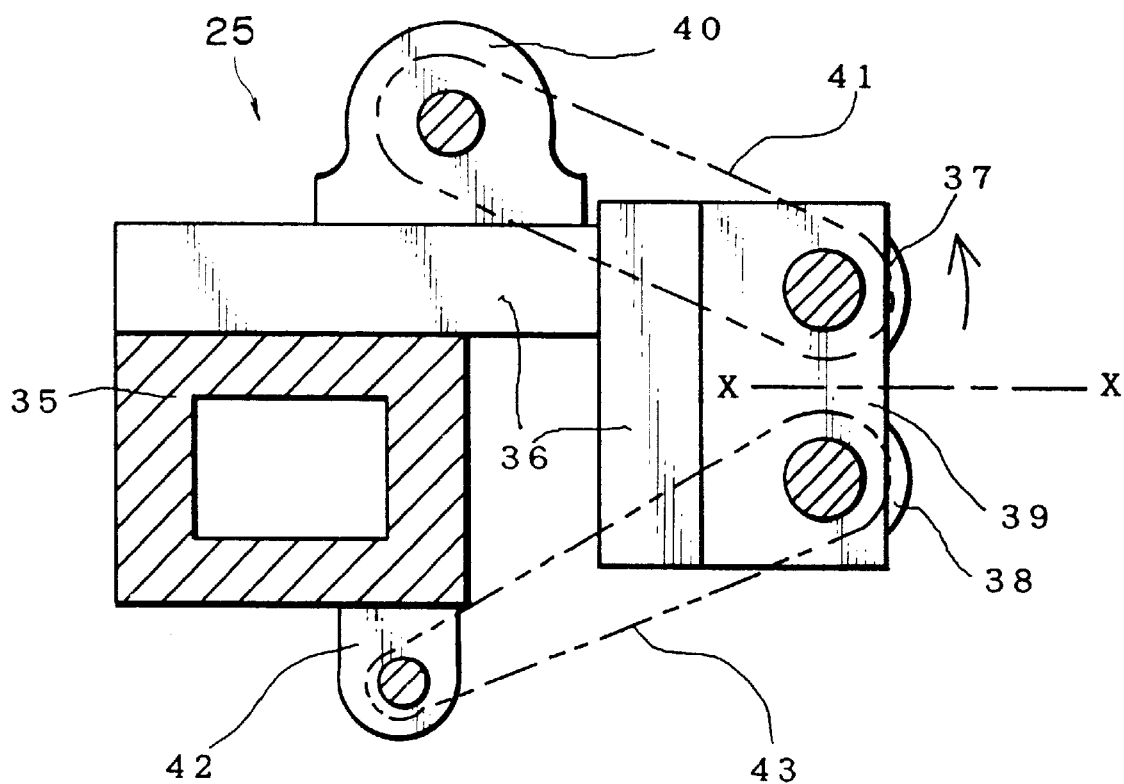
FIG. 7 is an illustrative view as seen in arrow direction from a dash-and-dot line K—K of FIG. 6.

As indicated in FIGS. 6 and 7, the backup device 25 carries a pair of rolls 37, 38 located one above the other extending in parallel to the axis of the log 1, and rotatably supported by bearings (not shown) in a support member 39 fixed to an L-shaped support block 36 which is in turn fixed to a hollow block 35 having a rectangular cross section and fixed at the opposite ends thereof to the blocks 31, respectively. In this embodiment, each roll has a diameter of about 115 mm and an axial length slightly greater than that of the log 1, ant the two rolls 37, 38 are radially spaced at a distance of about 145 mm as measured between the axes of the rolls. As shown in FIG. 7, the paired rolls 37, 38 are disposed such that the axes thereof are spaced at substantially the same distance from an imaginary line X—X which extends perpendicularly to the axis of the log 1 and in parallel to the direction in which the backup device 25 is moved.

The L-shaped support block 36 has a length smaller than that of the mounting block 35 and is fixed centrally to the block 35 so that spaces are provided on opposite sides of the mounting block 35 for chains 41 and timing belts 43, which will be described later, as seen in FIG. 6.

The backup device 25 further includes a detector 33 such as rotary encoder operable to count the number of turns of either one of the feed screw 30 of the backup device 25 thereby to determine the distance between the axial center of the log 1 and the peripheral surface of the rolls 37, 38 in contact with the log. As indicated by phantom lines in FIG. 1, the motor 34 and the detector 33 are connected to the control apparatus 22.

The upper roll 37 is drivingly connected by way of the chains 41 to a motor 40 mounted on top of the support block 36 for driving the roll in arrow direction as shown in FIG. 7 at a peripheral speed of about 62 meters per minute that is slightly higher than that of the roll bar 3. On the bottom of the mounting block 35 is fixed a detector 42 such as pulse counter having a rotatable shaft and a toothed wheel (not shown) for rotation with the shaft and connected by way of the timing belt 43 to a similar toothed wheel (not shown) on a shaft of the lower roll 38 so that the number of revolutions of the roll 38 is counted by the detector 42. The detector 42 is connected to the control apparatus 22 to provide thereto a pulse signal representing the current peripheral speed of the roll 38 and hence of the log 1. By so arranging, the control apparatus 22 is provided with information from the detectors 42, 20 necessary for the control apparatus to figure out the log rotational speed in terms of the number of revolutions per a given length of time (e.g. rpm), according to which the control apparatus can generate a command signal to the motor 21 for feeding the knife carriage 4 at a rate for peeling veneer T with the desired thickness even when the spindles have retracted from the log and therefore information from the spindle speed detector 23 is no more available. The control apparatus 22 also functions to control the operation of the motor 34 to drive the feed screws 30 synchronously for moving the backup device 25 toward the knife carriage 4 at a variable controlled rate, as will be explained hereinafter.

The control apparatus 22 of the veneer lathe according to the invention operates as follows.

During initial operation of the veneer lathe when the spindles S are engaged with the log 1 to support and drive the log and the knife 2 on the knife carriage is engaged with the log for cutting, while the backup device 27 is placed in its retracted position away from the log periphery, the control apparatus 22 responding to a signal from the spindle speed detector 23 generates a command signal ("first command signal") causing the motor 21 to move the knife carriage 4 for a predetermined distance for each turn of the log so that veneer T of the desired thickness is peeled from the log. Simultaneously, the control apparatus 22 operates from a signal from the log diameter detector 20 to control the operation of the spindle motor 24 so that the log 1 is rotated at the substantially constant peripheral speed.

At an appropriate time after the log 1 has been rounded or cut into a substantially cylindrical shape, a lathe operator manually applies an operation control signal to the control apparatus 22, which then activates the motor 34 to move the backup device 25 toward the log 1 at a rapid rate. This rapid movement is continued until the distance between the axial center of the log 1 and the peripheral surface in contact with the log of rolls 37, 38, which distance can be determined by the detector 33, becomes substantially the same as the distance between the log axial center and the tip cutting edge of the knife 2 (to be exact with the veneer thickness taken into consideration, a distance from the log axial center to the cutting edge on Archimedes spiral curve), which is measured by the detector 20. Thereafter, the control apparatus 22 causes the motor 34 to move the backup device 25 at substantially the same rate as the knife carriage 4. Accordingly, the rolls 37, 38 are moved toward the log axial center in contact with the log periphery while the log diameter is being reduced by continued veneer peeling operation. During such veneer peeling operation, the lower roll 38 which is then being driven by the rotating log 1 permits the detector 42 to monitor the peripheral speed of the log 1. The control apparatus 22 calculates from signals provided by the detectors 42, 20 a knife carriage feedrate necessary for the desired veneer thickness and, accordingly, generates a command signal for effecting such feedrate ("second command signal" hereinafter). It is noted, however, that at this time of lathe operation the above first command signal remains effective and the second command signal is yet to be provided to the motor 21.

As the veneer peeling has proceeded to such an extent that the distance detected by the detector 20 becomes a predetermined value which is slightly larger than the radius of the spindle S, the control apparatus 22 operates to change the first command signal to the second command signal to continue the synchronous movement of the knife carriage 4 and the backup device 25. After such changing has been completed, the control apparatus 22 generates a signal to the above-mentioned hydraulic cylinders to move the spindles S away from the log ends to their retracted positions, respectively.

When the log 1 is cut further to such an extent that the distance detected by the rotary encoder 20 has reached a predetermined value, e.g. about 40 mm, the control apparatus 22 causes the motors 21, 34 to stop the movement of the knife carriage 4 and the backup device 25 and subsequently to move them away from the log 1 to their retracted positions, respectively.

The following will explain in detail the operation of the above-described preferred embodiment of veneer lathe.

Before the peeling operation of the lathe, the spindles S are engaged with the log 1 at its axial ends to support and drive the log, while knife carriage 4 and the backup device 25 are placed at their retracted positions. Then, the motor 21 is activated to causes the knife carriage to move toward the log 1 according to the aforementioned first command signal from the control apparatus 22 responding to a signal from the spindle speed detector 23. As mentioned before, since the spindle speed is controlled so as to accelerates with a decrease of the distance between the axial center of the log 1 and the tip end of the knife 2, the spindle speed is increased progressively with the advancement of the knife carriage 4 toward the log 1.

In the meantime, the knife 2 and the roll bar 3 on the knife carriage 4 are brought into contact with the log periphery to start veneer peeling from the log 1 which is then driven by the roll bar 3 as well as by the spindles S. Since the roll bar drive motor 18 is equipped with the torque limiter, the rotational speed of the roll bar 3 is reduced by resistance due to its contact with the log 1 to a level corresponding to the log peripheral speed effected by the spindle drive. Thus, during the initial peeling operation of the lathe, the log 1 is rotated by driving forces provided by the spindles S and the roll bar 3.

If the lathe operator visually recognizes no more discontinuous strips of veneer coming out from the lathe, but a ribbon or continuous sheet of veneer being peeled from the log, i.e. when the log 1 has been rounded into a cylindrical shape, he operates on a control panel of the lathe to manually applies a signal to the control apparatus 22. In response to such signal, the control apparatus 22 activates the motor 34, which then causes the backup device 25 to move at a rapid rate toward the log 1 until the distances detected by the detectors 20, 33 become substantially the same, i.e. until the rolls 37, 38 are brought into contact with the log peripheral surface. Thereafter, the backup device 25 with the rolls 37, 38 in contact with the log periphery is advanced synchronously with the knife carriage 4 in accordance with the first command signal from the control apparatus 22 in the state as shown in FIG. 1.

The rolls 37, 38, which are kept in contact with the log periphery on the opposite side of the log from the knife carriage 4, perform the function of backup rolls to prevent the log 1 from being bent horizontally away from the knife carriage 4 by a force exerted by the knife 2 and the roll bar 3 even when the log is reduced to a smaller diameter with the progress of veneer peeling. The upper roll 37 which is positively driven by the motor 40 at a peripheral speed of about 62 meters per minute against about 58 meters per minute of the log 1 assists in rotating the log by supplying part of the driving force while slipping on the log periphery.

As the veneer peeling has proceeded to such an extent that the log radius determined by the detector 20 is reduced to the predetermined value that is slightly larger than the spindle radius, the control apparatus 22 is operated to change the first command signal to the second command signal, according to which the knife carriage 4 and the backup device 25 are continued to move synchronously at a variable controlled rate for peeling veneer T with the desired thickness. Upon changing from the first to second command signal, the control apparatus 22 actuates the hydraulic cylinders to move the spindles S away from the log axial ends to their retracted positions and, thereafter, the lathe operates in a centerless condition as illustrated in FIG. 8.

Figure 8:
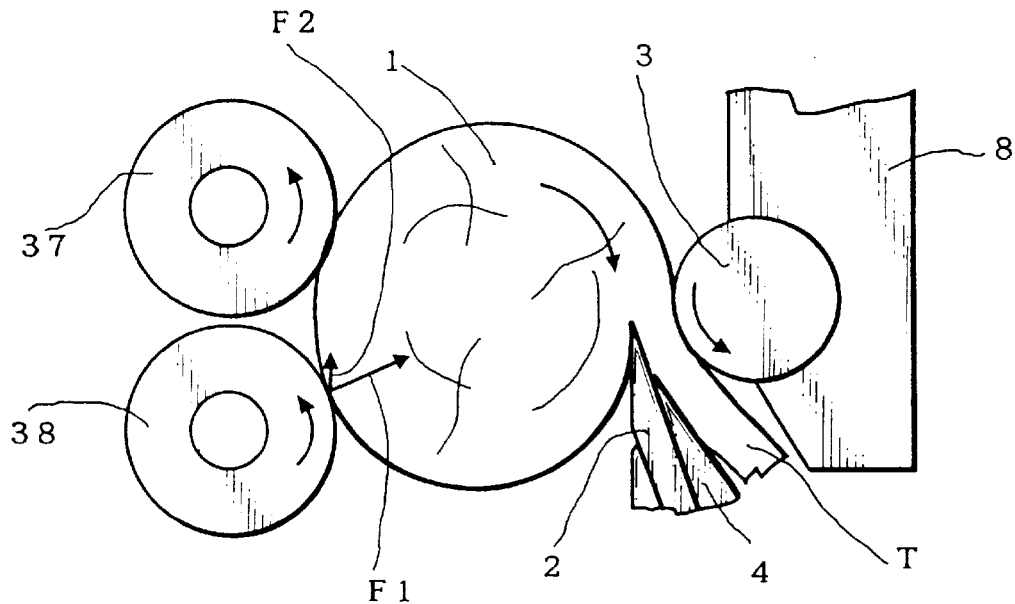
FIG. 8 is a schematic illustrative cross sectional view showing a peeler log with a pair of spindles withdrawn from the log ends.

Referring to the drawing of FIG. 8, reference symbol F1 indicates a force applied to the log 1 by the lower roll 38 and acting toward the log axial center, or rightwardly upward as seen in the drawing. As shown in the drawing, the vertical component F2 of the force F1 acts upward, aiding in supporting and holding the log 1 in place while it is being cut by the knife 2 without allowing the log to be dropped. As comprehended readily from the drawing, the upper roll 37 providing a frictional force acting upward also aids in supporting the log 1 in the centerless condition.

When the log radius monitored by the detector 20 is further reduced to the predetermined value of about 40 mm, the control apparatus 22 commands the motors 21, 34 to stop the movements of the knife carriage 4 and the backup device 25 and subsequently to retract them away from the log 1 to their original positions, respectively. Accordingly, the resulting small-diameter core log is dropped by its own weight.

As it is apparent from the foregoing, the rotary veneer lathe equipped with a pair of rolls engageable with the log periphery and movable synchronously with the knife carriage 4 offers an advantage over the above-described prior art in construction and, therefore, ease of maintenance, while permitting a log to be cut to a small diameter.

As will be understood by those skilled in the art, the present invention can be practiced in various ways other than the above preferred embodiment. The following will describe other forms of embodiment of the rotary veneer lathe according to the invention.

Figure 9:
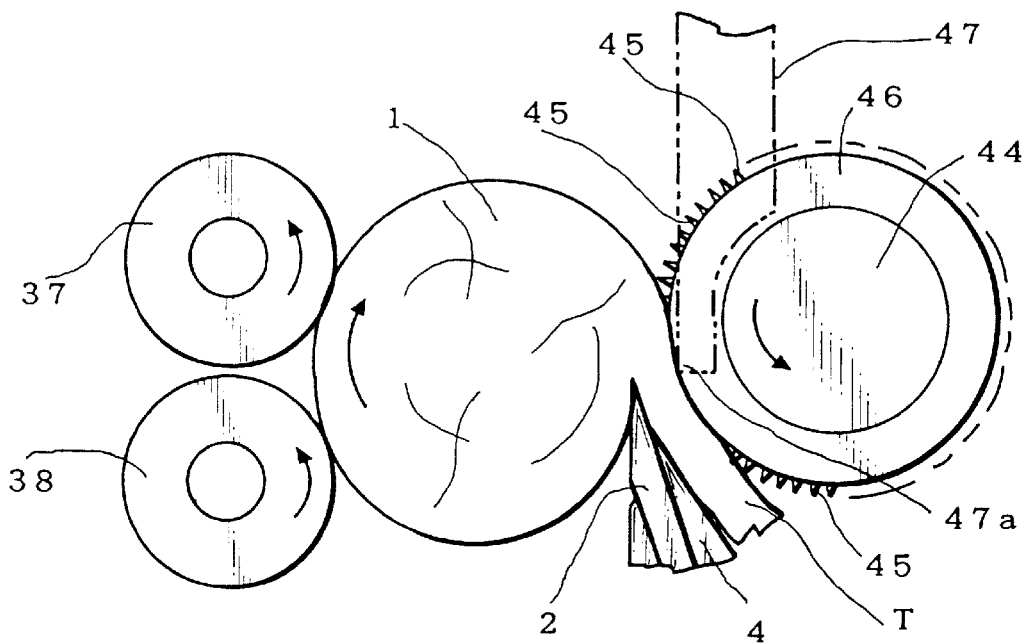
FIG. 9 is a view similar to that of FIG. 8, but showing a modified embodiment of the invention.

(1) Referring to FIG. 9 showing a first modified embodiment, this differs from the above preferred embodiment in that a spiked wheel assembly is employed instead of the roll bar 3, which comprises a drive shaft 44 disposed in parallel to the axis of the log 1 and rotatable in arrow direction by a motor (not shown) and a number of toothed or spiked wheels 46 each having a thickness of about 5 mm and mounted on the drive shaft 44 for rotation therewith at a spaced interval of about 35 mm. As shown in the drawing, each wheel 56 has a number of pointed projections 45 which cut into the log periphery. Between any two adjacent spiked wheels 46 is disposed a pressure bar 47 fixedly mounted to the block 7 of the knife carriage 4 and having at the bottom end a pressure portion 47a positioned adjacent the cutting edge of the knife 4 for pressing the log periphery during veneer peeling operation.

This embodiment is advantageous in that the log 1 is driven more positively for stabilized peripheral driving because the spikes 45 on the wheels 46 cut into the log for tight engagement with the log periphery, but at the cost of incised marks appearing on one surface of the resulting veneer sheet T.

Figure 10:
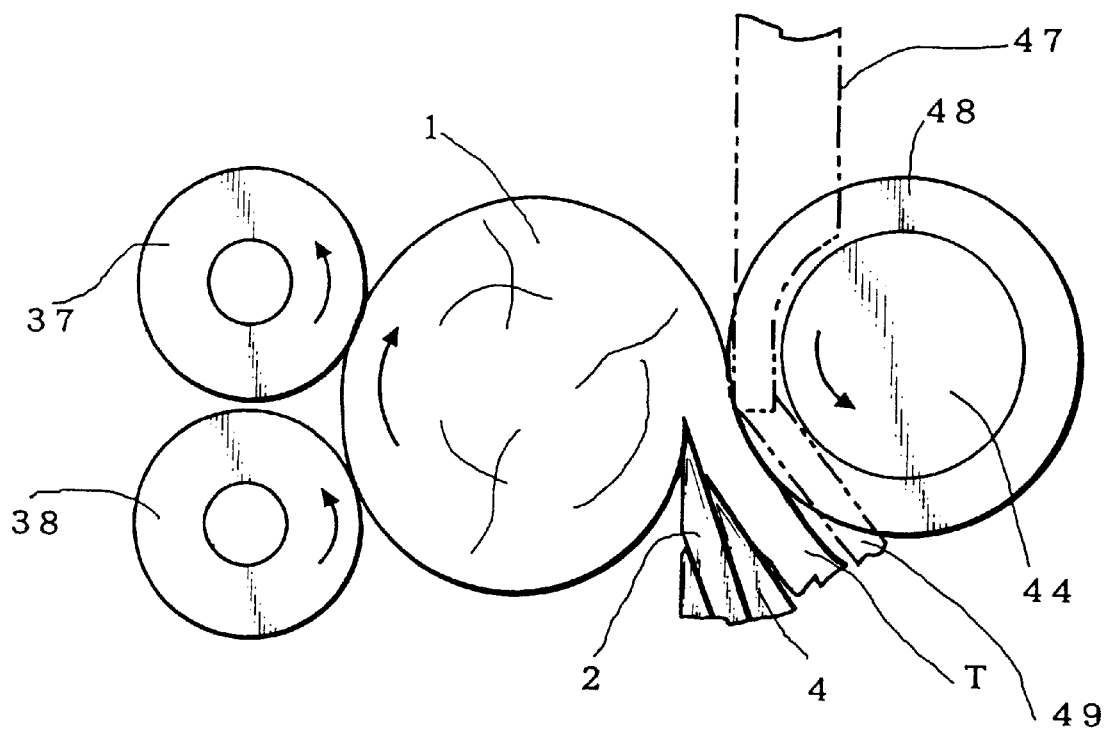
FIG. 10 is a view also similar to that of FIG. 8, but showing another modified embodiment of the invention.

(2) Referring to FIG. 10, this second modified embodiment differs from the first modification in that the spiked wheels 46 are substituted with wheels or discs 48 mounted on the drive shaft 44 for rotation therewith and each having a plain circumferential periphery and also that each of the pressure bars 47 has a support bar 49 whose bottom end (not shown) is fixed to the knife carriage 4 and whose top end is formed with a recess for receiving the bottom end of its associated pressure bar 47. The pressure bar 47 is supported by the support bar 49 and, therefore, bending of the pressure bar, which may be caused otherwise during veneer peeling operation, can be prevented.

In this embodiment, the discs 48 drive the log by friction and, therefore, it is required that the pressure at which the discs 48 are pressed against the log periphery should be greater than in the modification of FIG. 9. However, the use of the discs 48 is advantageous in that cut marks will not be produced on the veneer sheet surface as are caused by the spikes 45.

Though the drive discs 48 are disposed so that their peripheries are kept in contact with both the peripheral surface of the log 1 and the upper surface of veneer sheet T as seen from FIG. 10, but the drive shaft carrying the drive discs 48 may be disposed at a location higher than that shown in FIG. 10 so that drive discs 48 are set in pressing contact only with the log peripheral surface.

(3) The detector 20 provided in association with the feed screws 19 is used in the preferred embodiment of FIG. 1 for determining the log radius, but for the same purpose of detecting the log radial dimension after the rolls 37, 38 are brought in contact with the log 1, the detector 33 for counting the number of turns of the screw 30 for the backup device 25 may be used. The log radius may be determined also by means other than the above detectors, such as optical switch of diffuse reflection type which is operable to emit a light against the log peripheral surface and receive a light reflected therefrom thereby to measure the distance between the switch and the log surface, or mechanical detecting means comprising a rod having one end as pivotal point and the other end riding on the log peripheral surface and pivotable by its own weight with a decrease in the log diameter.

(4) For monitoring the log rotational speed after the spindles S have retracted, a freely rotatable roll independent of the paired rolls 37, 38 may be provided which is contactable and connected to a pulse counter such as the one 42. Alternatively, it may be so arranged that a suitable speed sensor is set in contact with the log at its axial end for measuring the log speed in terms of revolutions per a given length of time (e.g. rpm) after the spindles S have been retracted.

(5) As understood by those skilled in the art, the drive mechanisms for moving the knife carriage 4 and the backup device 25 comprising the feed screws 19, 30 and their associated motors 21, 34 may be substituted by hydraulic cylinders, respectively. In such a case, the detectors 20, 33 will be replaced with appropriate means for detecting, for example, the movement of piston rods of the cylinders.

(6) If the driving force to rotate the log 1 is sufficient, for example, because of the employment of spiked peripheral drive such as that used in the embodiment of FIG. 9, the drive motor 40 for the upper roll 37 of the backup device 25 may be dispensed with to provide both rolls 37, 38 as idle rolls.

(7) If the driving force for the log 1 is not sufficient, on the other hand, the drive roll 37 may be clad round its periphery with an elastic material such as rubber to increase the friction between the roll and the log peripheral surface or, alternatively, the roll may be formed with a number of projections similar to the spikes 45 on the drive wheel 46 of FIG. 9.

(8) As a further modification, the rolls 37, 38 of the backup device 25 may be substituted with one another so that the lower roll is driven by a motor for driving the log 1, while the upper roll is driven by the rotating log for detecting its rotational speed. In such a case, the upper drive roll may be formed on its periphery with an elastic material or spikes as referred to in the above.

Figure 11:
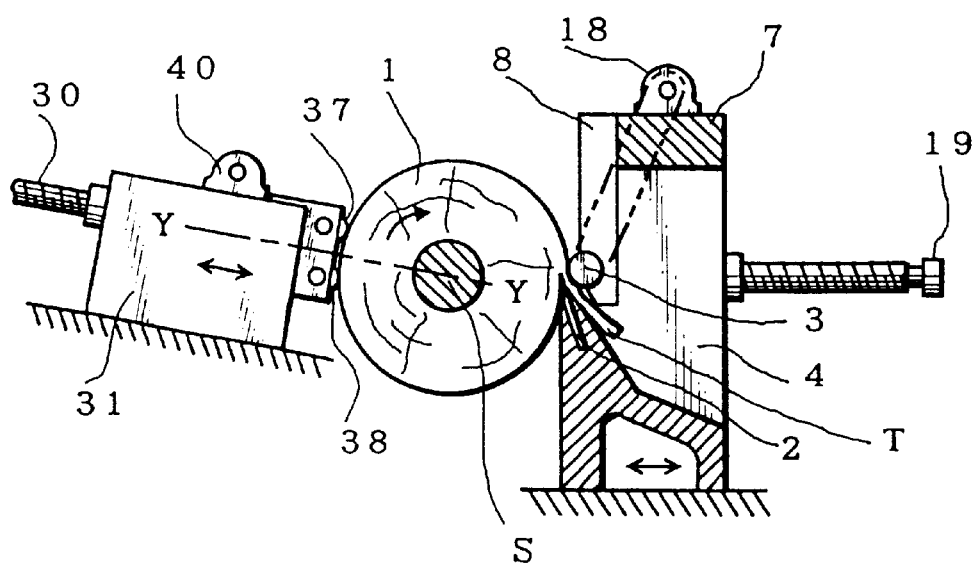
FIG. 11 is a schematic cross sectional view showing still another modified embodiment of the invention.

(9) As mentioned earlier with reference to FIG. 8, at least the upwardly directed component F2 of the lower roll 38 acting on the log 1 helps to keep the log from being dropped even with the spindles S have moved away from the log axial ends. Such force acting to support the log in its peeling position can be strengthened by increasing the driving force of the upper drive roller 37 or by using the lower roll as the driving roll as in the above modified embodiment. Provided that a sufficient force is available for supporting the log without the spindles S, the paired rolls 37, 38 do not have to be moved horizontally, but it may be so arranged that the backup device 25 is movable at an angle with respect to the horizontal, as shown in FIG. 11. To be more specific, the backup device 25 is movable obliquely downward as it approaches the axial center of the log 1. In such a case, the rolls 37, 38 of the backup device 25 are disposed such that the axes of such two rolls 37, 38 are spaced at substantially the same distance from an imaginary line Y—Y (FIG. 11) extending perpendicularly to the axis of the log and in parallel to the direction in which the backup 25 device is moved. With the backup device 15 thus arranged, however, the magnitude of the upwardly directed force to support the log 1 will be reduced. To prevent the log 1 from being dropped, the angle of the line Y—Y with respect to the horizontal should be selected within a range where a force enough to support the log is available in view of a possible maximum weight of the log 1 when the spindles S are just retracted.

Figure 12:
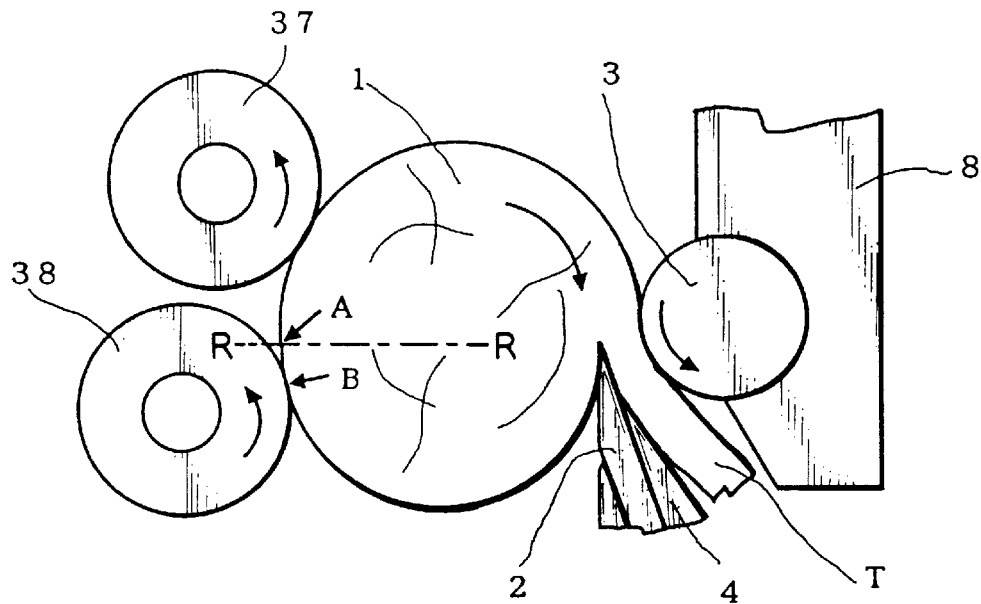
FIG. 12 is a view similar to that of FIG. 8, but showing still another modification of the invention.

As a matter of course, the log 1 will not be dropped if the paired rolls 37, 38 are so arranged that the contact point B between the log peripheral surface and the lower roll 38, shown in FIG. 12, is located below the point A which defines an intersection between a horizontal line R—R passing radially through the log axis and the circumference of the log as seen in cross section and, therefore, the distance between the contact point B and the tip end of the knife 2 is smaller than the distance between the point A and the knife tip end.

Figure 13:
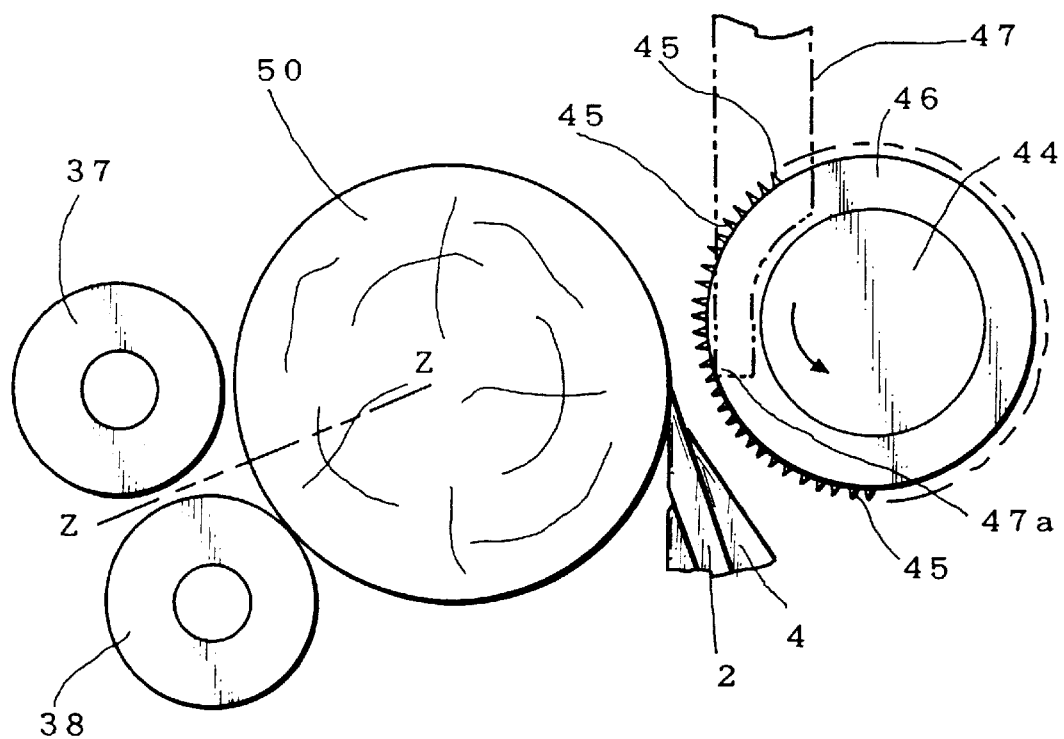
FIG. 13 is a view similar to that of FIG. 8, but showing still another modification of the invention.

(10) FIG. 13 shows a further modified embodiment of the invention which differs from the modification of FIG. 11 in that the backup device 25 is movable at such an angle with respect to the horizontal that it moves obliquely upward as it approaches the axial center of the log 1. In this embodiment, the rolls 37, 38 are so arranged that the axes of these two rolls are spaced at substantially the same distance from an imaginary line Z—Z extending perpendicularly to the axis of the log and in parallel to the direction in which the backup 25 device is moved. Both rolls 37, 38 are idle rolls and the lower roll 38 has a pulse counter (not shown) for measuring the rotational speed of the log 1. As shown in FIG. 11, the veneer lathe of this embodiment includes the log peripheral drive comprising the spiked wheels 46 fixedly mounted on the drive shaft 44, as in the embodiment of FIG. 9.

This embodiment also differs from the above-described embodiments in that the spindles S are dispensed with. It is noted that the drawing of FIG. 13 shows a condition wherein a log 50 is supported by the lower roll 38 and the tip end of the knife 2 and the drive wheels 46 are positioned clear of the log peripheral surface. To be more specific, the veneer lathe of FIG. 13 is advantageously applicable to handling a core stock which has been already peeled by a conventional lathe to a cylindrical shape with a diameter that is still large enough for further peeling in a manner which will be described in the following.

Before the lathe receives a new core stock 50 to be peeled, the backup device 25 and the knife carriage 4 are located where the distance between the lower roll 38 and the tip end of the knife 2 is slightly smaller than the diameter of the core log 50. The core log 50 is supplied from the top and received between the lower roll 38 and the knife 2 as shown in FIG. 13. Subsequently, the knife carriage 4 and the backup device 25 are moved synchronously toward each other at a variable controlled rate in the manner as described with reference to the preceding embodiments. As the core log 50 is pushed upward by the advancing roll 38, the core log 50 is set in engagement with both rolls 37, 38 and the spikes 45 of the peripheral drive, thus veneer peeling being started.

Though this embodiment having a backup device movable obliquely with respect to the horizontal as shown in FIG. 13 can dispense with spindles when cutting a cylindrical core log, it does not necessarily preclude the use of the spindles when it is desired to handle a log having a irregular peripheral surface. It is also noted that the peripheral drive 44, 45, 46 may be substituted by any other form of peripheral drive system as referred to in the embodiments according to the invention.

What is claimed is:

1. A rotary veneer lathe for peeling wood veneer from a log comprising:
    a pair of rotatable spindles for supporting and driving the log at the opposite ends thereof, said spindles being retractable from the log ends in the middle of veneer peeling operation of the lathe;
    a slidable knife carriage carrying a veneer peeling knife having a cutting edge at the tip end thereof;
    means for moving said knife carriage toward the axial center of the log;
    a peripheral drive engageable with the log peripheral surface adjacent the cutting edge of said knife for rotating the log;
    a slidable backup device disposed on the opposite side of the log from said knife carriage and having a pair of rotatable rolls carried by said backup device for movement therewith and located one above the other with the axes thereof extending parallel to the axis of the log;
    means for moving said backup device linearly so as to bring said paired rolls into engagement with the log peripheral surface and thereafter to move the rolls in engagement with the log periphery toward said knife carriage, said rolls being disposed such that the axes of said pair of rolls are spaced at substantially the same distance from an imaginary line extending perpendicularly to the axis of the log and in parallel to the direction in which said backup device is moved; and
    control means operable to control the operation of said respective means for moving the knife carriage and the backup device such that said knife carriage and said backup device are moved synchronously at a variable rate which causes peeling of veneer with a predetermined thickness.

2. A rotary veneer lathe according to claim 1, further comprising means for detecting the current radius of the log and means for detecting the current rotational speed of the log, said control means being operable to effect the synchronous movement of said knife carriage and said backup device at said variable rate according to the current radius and rotational speed of the log determined by said respective detecting means.

3. A rotary veneer lathe according to claim 2, wherein said log rotational speed detecting means is adapted to measure the peripheral speed of the log.

4. A rotary veneer lathe according to claim 3, wherein one of said paired rolls is adapted to be driven by the rotating log in contact therewith and said log rotational speed detecting means is operatively connected with said one roll.

5. A rotary veneer lathe according to claim 4, wherein the other of said paired rolls is adapted to positively driven so as to aid in rotating the log.

6. A rotary veneer lathe according to claim 4, wherein said one roll is located below the other of the paired rolls.

7. A rotary veneer lathe according to claim 2, wherein said log radius detecting means is operatively connected with said knife carriage moving means.

8. A rotary veneer lathe according to claim 2, wherein said log radius detecting means is operatively connected with said backup device moving means.

9. A rotary veneer lathe according to claim 1, wherein said control means is operable to activate said backup device moving means to bring said paired rolls into engagement with the log peripheral surface after the log has been rounded into a substantially cylindrical shape.

10. A rotary veneer lathe according to claim 1, wherein said peripheral drive includes a rotatable roll bar extending in parallel to the axis of the log and having a number of projections on the peripheral surface thereof for driving engagement with the log peripheral surface.

11. A rotary veneer lathe according to claim 1, wherein said peripheral drive includes a plurality of wheels arranged at spaced intervals in parallel to the axis of the log for driving engagement with the log peripheral surface, said veneer lathe further comprising a plurality of pressure bars each located between any two adjacent wheels for pressing the log peripheral surface adjacent the cutting edge of said knife.

12. A rotary veneer lathe according to claim 11, wherein each of said drive wheels includes a toothed wheel.

13. A rotary veneer lathe according to claim 11, wherein each of said drive wheels includes a wheel having a plain circumferential periphery.

14. A rotary veneer lathe according to claim 1, wherein said peripheral drive is adapted to rotate the log at a substantially constant peripheral speed.

15. A rotary veneer lathe according to claim 1, wherein said backup device is movable horizontally toward the axial center of the log.

16. A rotary veneer lathe according to claim 1, wherein said backup device is movable obliquely with respect to the horizontal toward the axial center of the log.

17. A rotary veneer lathe for peeling wood veneer from a log comprising:
- a slidable knife carriage carrying a veneer peeling knife having a cutting edge at the tip end thereof;
- means for moving said knife carriage toward the axial center of the log;
- a peripheral drive engageable with the log periphery adjacent the cutting edge of said knife for rotating the log:
- a slidable backup device disposed on the opposite side of the log from said knife carriage and movable along a line which is oblique with respect to the horizontal, said backup device having a pair of rotatable rolls carried by said backup device for movement therewith and located one above the other with the axes thereof extending parallel to the axis of the log;
- means for moving said backup device linearly so as to move the rolls toward said knife carriage, said oblique line along which said backup device is moved is directed such that said backup device is moved upward gradually while moving toward said knife carriage, said rolls being disposed such that the axes of said pair of rolls are spaced at substantially the same distance from an imaginary line extending perpendicularly to the axis of the log and parallel to the direction in which said backup device is moved; and
- control means operable to control the operation of said respective means for moving the knife carriage and the backup device such that said knife carriage and said backup device are moved synchronously at a variable rate which causes peeling of veneer with a predetermined thickness.

18. A rotary veneer lathe according to claim 17, further comprising means for detecting the current radius of the log and means for detecting the current rotational speed of the log, said control means being operable to effect the synchronous movement of said knife carriage and said backup device at said variable rate according to the current radius and rotational speed of the log determined by said respective detecting means.

19. A rotary veneer lathe according to claim 18, wherein said log rotational speed detecting means is adapted to measure the peripheral speed of the log.

20. A rotary veneer lathe according to claim 19, wherein one of said paired rolls is adapted to be driven by the rotating log in contact therewith and said log rotational speed detecting means is operatively connected with said one roll.

21. A rotary veneer lathe according to claim 20, wherein the other of said paired rolls is adapted to positively driven so as to aid in rotating the log.

22. A rotary veneer lathe according to claim 20, wherein said one roll is located below the other of the paired rolls.

23. A rotary veneer lathe according to claim 18, wherein said log radius detecting means is operatively connected with said knife carriage moving means.

24. A rotary veneer lathe according to claim 18, wherein said log radius detecting means is operatively connected with said backup device moving means.

25. A rotary veneer lathe according to claim 17, wherein said peripheral drive includes a rotatable roll bar extending in parallel to the axis of the log and having a number of projections on the peripheral surface thereof for driving engagement with the log peripheral surface.

26. A rotary veneer lathe according to claim 17, wherein said peripheral drive includes a plurality of toothed wheels arranged at spaced intervals in parallel to the axis of the log for driving engagement with the log peripheral surface, said veneer lathe further comprising a plurality of pressure bars each located between any two adjacent toothed wheels for pressing the log peripheral surface adjacent the cutting edge of said knife.

27. A rotary veneer lathe according to claim 26, wherein each of said drive wheels includes a toothed wheel.

28. A rotary veneer lathe according to claim 26, wherein each of said drive wheels includes a wheel having a plain circumferential periphery.

29. A rotary veneer lathe according to claim 17, wherein said peripheral drive is adapted to rotate the log at a substantially constant peripheral speed.

* * * * *

UNITED STATES PATENT AND TRADEMARK OFFICE
CERTIFICATE OF CORRECTION

PATENT NO. : 5,927,360

DATED : July 27, 1999

INVENTOR(S) : Tsuyoshi NAKAMURA and Kazuya KAWAI

It is certified that error appears in the above-identified patent and that said Letters Patent is hereby corrected as shown below:

Column 1, line 32, delete "above"; before first word "the" (first occurrence) insert --above--;

Column 2, line 13, after "pair" insert --of--;

Column 2, line 15, after "extending" delete the word "in";

Column 2, line 23, delete the word "in";

Column 2, line 59, change "active" to --activate--;

Column 2, line 63, after "has" and before "been" insert --already--; after same word "been" delete "already";

Column 2, line 66, after "along" delete "a such";

Column 2, line 66, after "line" insert --such--;

Column 3, line 47, before "arrow" insert --the--;

Column 3, line 55, after "extending" delete "in";

Column 3, line 57, after "adjacent" insert --to--;

Column 3, line 58, change "lather" to --lathe--;

Column 4, line 30, change "round" to --around--;

UNITED STATES PATENT AND TRADEMARK OFFICE
CERTIFICATE OF CORRECTION

PATENT NO. : 5,927,360

DATED : July 27, 1999

INVENTOR(S) : Tsuyoshi NAKAMURA and Kazuya KAWAI

It is certified that error appears in the above-identified patent and that said Letters Patent is hereby corrected as shown below:

Column 4, line 52, after "as" insert --a--;

Column 4, line 57, before "rotary" insert --a--;

Column 4, line 58, change "screw" to --screws--;

Column 5, line 1, change "now" to --not--;

Column 5, line 3, after "in" insert --the--;

Column 5, line 5, before "DC" insert --a--;

Column 5, line 6, after "is" insert --also--;

Column 5, line 7, delete the first word "also";

Column 5, line 8, before "rotary" insert --a--;

Column 5, line 19, after "radius" insert --is--;

Column 5, line 26, change "smaller" to --less--;

Column 5, line 34, after "by" insert --the--;

Column 5, line 35, after the comma "," insert --each of--; after "31" change "have" to --has--;

Column 5, line 38, after "as" insert --a--;

UNITED STATES PATENT AND TRADEMARK OFFICE
CERTIFICATE OF CORRECTION

PATENT NO. : 5,927,360

DATED : July 27, 1999

INVENTOR(S) : Tsuyoshi NAKAMURA and Kazuya KAWAI

It is certified that error appears in the above-identified patent and that said Letters Patent is hereby corrected as shown below:

Column 5, line 41, after "extending" delete "in";

Column 5, line 48, change first word "ant" to --and--;

Column 5, line 53, after "and" delete "in";

Column 5, line 62, after "as" insert --a--;

Column 5, line 63, change "screw" to --screws--;

Column 6, line 5, after "in" insert --the--;

Column 6, line 8, after "as" insert --a--;

Column 6, line 25, delete "more" and substitute --longer--;

Column 6, line 53, after "peripheral" delete "surface" and substitute --surfaces of rolls 37, 38--;

Column 6 line 54, after "log" and before the comma "," delete "of rolls 37, 38";

Column 6, line 57, after "exact" insert a comma --,--;

Column 6, line 59, after "on" insert --an--;

Column 6, line 65, after "by" insert --the--;

UNITED STATES PATENT AND TRADEMARK OFFICE
CERTIFICATE OF CORRECTION

PATENT NO. : 5,927,360

DATED : July 27, 1999

INVENTOR(S) : Tsuyoshi NAKAMURA and Kazuya KAWAI

It is certified that error appears in the above-identified patent and that said Letters Patent is hereby corrected as shown below:

Column 7, line 7, change "above" to --above-mentioned--;

Column 7, line 10, change first word "As" to --After--;

Column 7, line 11, change "becomes" to --has become--;

Column 7, line 38, change "accelerates" to --accelerate--;

Column 7, line 58, after "operates" delete "on";

Column 7, line 59, change first word "applies" to --apply--;

Column 8, line 8, change "a force" to --forces--;

Column 8, line 9, after "3" delete --even--;

Column 8, line 15, change first word "As" to --After--;

Column 8, line 16, change "is" to --has been--;

Column 8, line 21, after "25", delete "are continued" and substitute --continue--;

Column 8, line 30, after "rightwardly" delete "upward" and substitute --and upwardly--;

UNITED STATES PATENT AND TRADEMARK OFFICE
CERTIFICATE OF CORRECTION

PATENT NO. : 5,927,360
DATED : July 27, 1999
INVENTOR(S) : Tsuyoshi NAKAMURA and Kazuya KAWAI It is certified that error appears in the above-identified patent and that said Letters Patent is hereby corrected as shown below:

Column 8, line 45, after "As" delete "it";

Column 8, line 59, delete last word "in";

Column 9, line 5, before "veneer" insert --the--;

Column 9, line 22, after "which" delete "may be caused" and substitute --might--; after "otherwise" insert --be caused--; after "during" insert --the--;

Column 9, line 34, delete "but";

Column 9, line 45, after "as" insert --an--;

Column 9, line 46, after "of" insert --a--;

Column 9, line 49, after "or" insert --a--;

Column 9, line 50, delete "pivotal" and substitute --a pivot--;

Column 9, line 66, change "substituted" to --replaced;

Column 10, line 3, after "of" (first occurrence) insert --the--; delete "of" (second occurrence) and substitute --in--;

Column 10, line 5, after "of" (second occurrence) insert --a--;

Column 10, line 11, change first word "round" to --around--;

UNITED STATES PATENT AND TRADEMARK OFFICE
CERTIFICATE OF CORRECTION

PATENT NO. : 5,927,360

DATED : July 27, 1999

INVENTOR(S) : Tsuyoshi NAKAMURA and Kazuya KAWAI

It is certified that error appears in the above-identified patent and that said Letters Patent is hereby corrected as shown below:

Column 10, line 18, change "substituted' to --exchanged--;

Column 10, line 27, change "with" to --when--;

Column 10, line 34, after "but" delete "it";

Column 11, line 39, change 'a" (second occurrence) to --an--;

Column 11, line 41, change "substituted" to --replaced.

Signed and Sealed this

Sixth Day of March, 2001

Attest:

NICHOLAS P. GODICI

Attesting Officer    Acting Director of the United States Patent and Trademark Office